US007240582B1

(12) United States Patent
Manaras et al.

(10) Patent No.: US 7,240,582 B1
(45) Date of Patent: Jul. 10, 2007

(54) OVERRIDE DEVICE FOR ALLOWING MANUAL OPERATION OF A CLOSURE NORMALLY DRIVEN BY AN ELECTRIC MOTOR

(76) Inventors: Michel Manaras, 155 Shubert, Dollard Des Ormeaux, Quebec (CA) H9B 2E5; Eddy Desrochers, 3035 P. Thomas Hurteau #2, St-Hubert, Quebec (CA) J3Y 2K6

( * ) Notice: Subject to any disclaimer, the term of this patent is extended or adjusted under 35 U.S.C. 154(b) by 0 days.

(21) Appl. No.: 08/272,002

(22) Filed: Jul. 8, 1994

(30) Foreign Application Priority Data

Dec. 23, 1993 (CA) .................................... 2112350

(51) Int. Cl.
*F16H 53/00* (2006.01)

(52) U.S. Cl. .......................... 74/567; 74/563; 74/568 T

(58) Field of Classification Search .................. 74/567, 74/568 R, 568 T, 569
See application file for complete search history.

(56) References Cited

U.S. PATENT DOCUMENTS 3,325,609 A * 6/1967 Otterlei ................ 74/568 T X
4,022,075 A * 5/1977 Schuder et al. ......... 74/568 T X
4,079,636 A * 3/1978 Altenschulte et al. ..... 74/568 T
4,302,639 A * 11/1981 Lewis et al. ........... 74/568 T X
4,945,196 A * 7/1990 Mahon et al. ......... 74/568 T X
5,307,703 A * 5/1994 Kurosawa ................. 74/567 X
5,357,917 A * 10/1994 Everts ...................... 74/567 X

FOREIGN PATENT DOCUMENTS

CA 1165785 4/1984
DE 2655540 * 6/1977 ............... 74/568 T
JP 6-50408 * 2/1994 .................. 74/567

* cited by examiner

*Primary Examiner*—Vinh T. Luong
(74) *Attorney, Agent, or Firm*—Swabey Ogilvy Renault

(57) ABSTRACT

An override device is proposed to permit the manual operation of a closure which is normally driven by an electric motor. The override device comprises a manual closure driving mechanism, such as a chain engaged around a pulley, which when operated first produces the translation of a first gear along its rotation axis until this first gear meshes with a second gear connected to the output shaft of the motor which normally drives the closure. During the translation of the first gear, a switch is tripped to safely interrupt power to the motor and a mechanism is operated to disengage the motor from the output shaft. Thereafter, further operation of the chain, and therefore further rotation of the pulley, is adapted to cause the first gear to rotate instead of translating, whereby the second gear is driven into rotation by the first gear thereby causing the rotation of the output shaft and the manual operation of the closure. More particularly, the first gear is prevented from rotating with a cam mechanism associated with the pulley causing the translation of the first gear and, once the first and second gears become so engaged, the first gear can rotate with the pulley.

3 Claims, 6 Drawing Sheets

OVERRIDE DEVICE FOR ALLOWING MANUAL OPERATION OF A CLOSURE NORMALLY DRIVEN BY AN ELECTRIC MOTOR

BACKGROUND OF THE INVENTION

1. Field of the Invention

The present invention relates to the operation of a closure normally driven by an electric motor and, more particularly, to an override device for allowing manual operation thereof.

2. Description of the Prior Art

It is well known in the art of closures operated by way of electric motors to provide each system with an override device to permit manual operation of the closure in the event, for instance, of a failure of the electric motor. Safety-wise, such an override system must also prevent the motor from operating during the manual opening or closing of the closure.

Canadian Patent No. 1,165,785 issued on Apr. 17, 1984, for instance, discloses the basics of such an override device of the prior art.

More particularly, with reference to FIGS. 1 and 2 of the aforementioned Canadian Patent, a door operator 10 comprises an electric motor 11 adapted to drive a V-belt pulley 12 mounted on the motor shaft which in turn drives, by way of a V-belt 15, a larger V-belt pulley 13 provided on an intermediate shaft 14. A chain drive 16 connects the intermediate shaft 14 to an intermediate sprocket 17 mounted on shaft 18 while a further chain drive 19 joins the shaft 18 to a drive sprocket 20 which operates an output shaft 21. The output shaft 21 which is supported on two pillow blocks 22 mounted on frame members 23 is adapted to open and close a closure, such as a garage door or the like.

A control box 25 is mounted on the frame members 23. The motor shaft is provided with a brake 27 which is operated by a lever mechanism 28. The lever mechanism 28 is connected to an arm 29 rotated by a shaft 30 entering the control box 25. More importantly with respect to the present invention, a manual release lever 31 provided on the other side of the door operator 10 from the brake 27 comprises a linkage which is not shown for allowing the brake 27 to be manually released when it is necessary to operate the door operator 10 manually.

More particularly, there is provided adjacent the manual release lever 31 a chain sprocket 32 with a chain 33 being engaged thereon for permitting manual operation thereof. When it is desired to manually operate the closure, the manual chain 33 is operated manually with the release lever 31 for the brake 27 being activated. Also, a safety interlock switch 43 is adapted to simultaneously disconnect power to the electric motor 11 in order to prevent the power to be accidentally turned on while the closure is being manually opened or closed.

A solenoid 42 operates in such a way so as to rotate the brake shaft 30, whereby when the electric motor 11 is powered to go in either direction the solenoid 42 is energized thereby causing the brake 27 to be released. The safety interlock switch 43 comprises a linkage, which is not shown, connected to the brake release arm 31 so that, if the door operator 10 is manually used, the safety interlock switch 43 is moved to the "off" position thereof thereby preventing the electric motor 11 from being accidentally switched on.

Therefore, the manual release lever 31 allows the brake 27 to be manually released thereby permitting manual operation of the closure by way of the chain 33 and sprocket 32. The manual release lever 31 also causes the safety disconnect switch to cut the power to the electric motor 11.

Accordingly, it is necessary for manually opening or closing a closure to manually operate both a brake release lever which also disconnects power to the motor, and a chain and sprocket assembly.

SUMMARY OF THE INVENTION

It is therefore an aim of the present invention to provide a novel override device which is simpler in allowing the manual operation of a closure normally operated by an electric motor.

It is also an aim of the present invention to provide an override device wherein a single manual operation both disconnects power to the electric motor and manually operates the closure.

It is a further aim of the present invention to provide an override device which also disengages in the above single step the motor from the closure actuating mechanism.

Therefore, in accordance with the present invention, there is provided an override device for allowing manual operation of an apparatus normally driven by a motor, an output shaft being normally driven by the motor, comprising a manual actuating means, a first drive means operated by the actuating means, a second drive means adapted to be driven by the first drive means and to drive the output shaft during the operation of the override device, a power cut-off means adapted when operated to interrupt power to the motor, disengagement means which when operated is adapted to disengage the motor from the output shaft for allowing the second drive means to drive the output shaft while the motor is not operating, the actuating means being adapted, when manually operated, to first cause an engagement of the first and second drive means while causing the power cut-off means to cut power to the motor and the disengagement means to allow the second drive means to drive the output shaft, the actuating means being adapted to then cause the first drive means to drive the second drive means and thus also the output shaft connected to the second drive means for manual operation of the apparatus.

More specifically, the first and second drive means comprising respectively first and second gears disposed in a parallel relationship, the second gear being connected to the output shaft for rotation therewith, the actuating means being adapted to displace the first gear relative to the second gear between first and second positions, wherein the first and second gears are in meshed engagement only in the second position, the displacement in translation of the first gear operating the power cut-off means and the disengagement means respectively for interrupting power to the motor and for allowing the second gear to drive the output shaft while the motor is non operational.

Even more specifically, the actuating means comprises a chain means engaged on a pulley means, a cam means abutting the pulley means and adapted upon initial rotation of the pulley means to axially displace the first gear for the displacement in translation from the first position towards the second position in engagement with the second gear, wherein further rotation of the pulley means with the first gear in the second position causes the rotation of the first gear and thus of the second gear and of the output shaft.

BRIEF DESCRIPTION OF THE DRAWINGS

Having thus generally described the nature of the invention, reference will now be made to the accompanying drawings, showing by way of illustration a preferred embodiment thereof, and in which.

DESCRIPTION OF THE PREFERRED EMBODIMENTS

In accordance with the present invention, FIGS. 1 to 5 illustrate a first override device D in accordance with the present invention for allowing a closure normally driven by an electric motor to be manually operated in a single step requiring the handling of a single actuating mechanism, such as herein shown a chain hoist.

Figure 1:
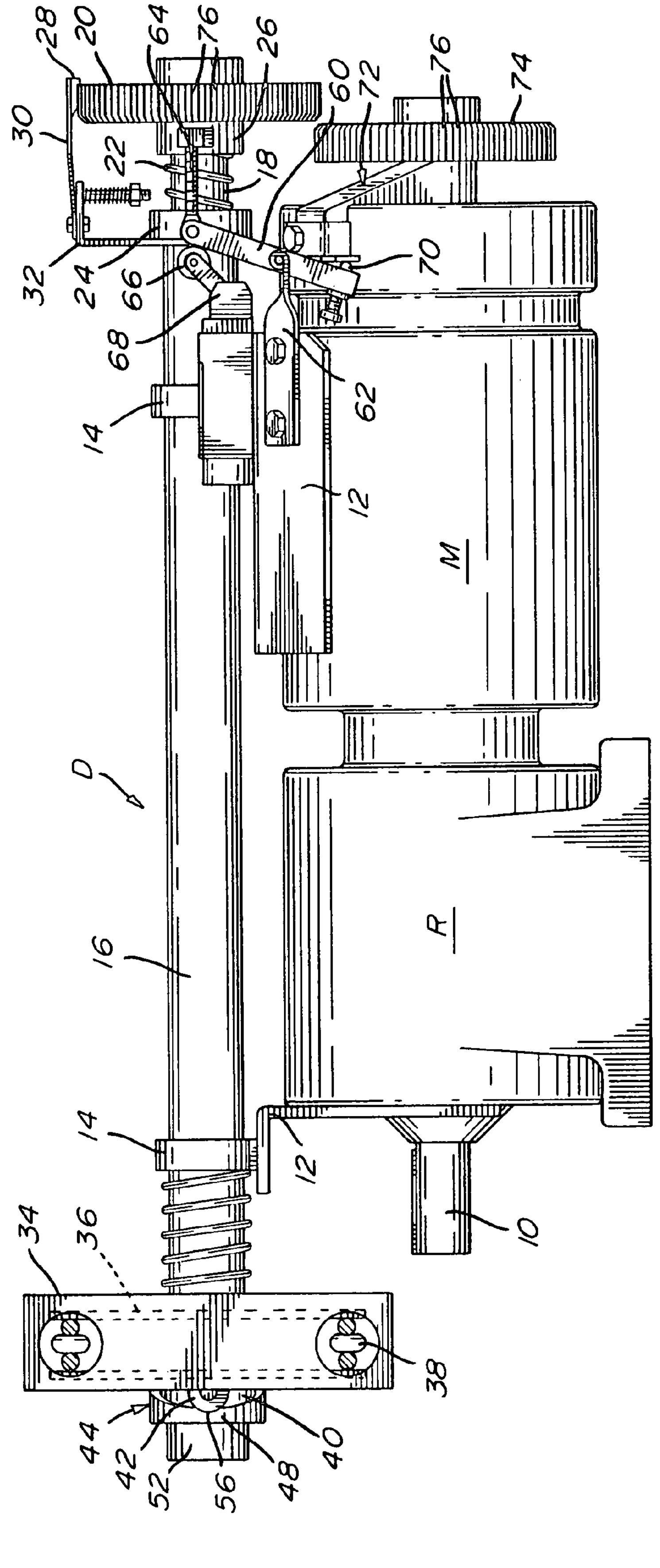
FIG. 1 is a bottom plan view partly in cross-section of a first embodiment of an override device in accordance with the present invention for allowing manual operation of a closure normally driven by an electric motor, the device being shown in a first position thereof wherein the closure is adapted to be driven by the electric motor.

With reference mainly to FIG. 1 which shows the device D in a normal, i.e. motor driven, position, the override device D is adapted on an electric motor M provided with a gearbox reducer R. An output shaft 10 is adapted to drive a closure, such as a garage door (not shown).

The override device D comprises the following components. A pair of brackets 12 which are secured to the motor M and reducer R support with a pair of collars 14 an elongated fixed sleeve 16 of annular cross-section. An elongated drive shaft 18 is journaled in the sleeve 16 for rotation therein and also for longitudinal displacement therealong. A first gear wheel 20 is fixedly secured at a first end (the right end on FIGS. 1 and 2) of the shaft 18. A first spring 22 disposed around the first end of the shaft 18 is compressed between an enlarged end 24 of the sleeve 16 and a hub 26 of the first gear wheel 20. In the right-handmost position of the shaft 18 of FIG. 1, the teeth of the first gear wheel 20 are engaged by a V-shaped finger 28 of an arm 30 which is mounted to the sleeve 16 by way of a bracket 32.

Figure 4:
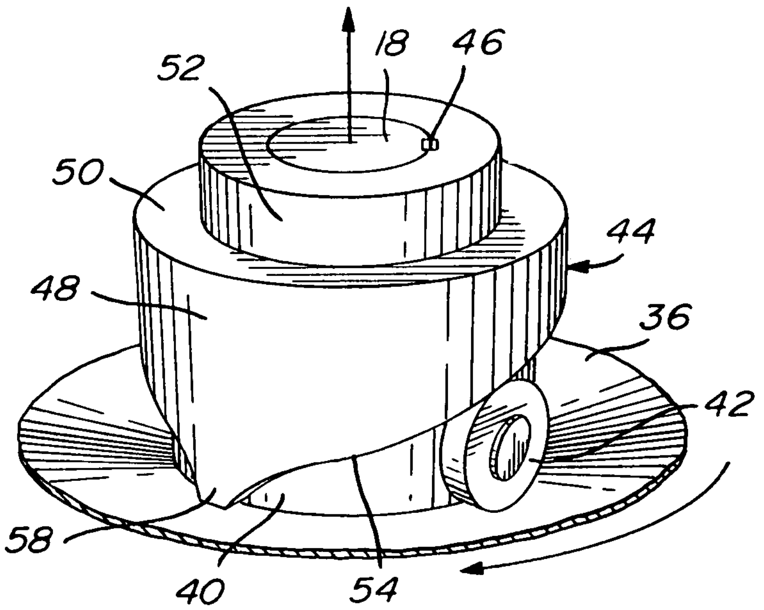
FIGS. 4 and 5 are perspective views showing details of components of the override device of FIGS. 1 to 3 and, more particularly, of a cam assembly and of a gear tooth, respectively.
Figure 3:
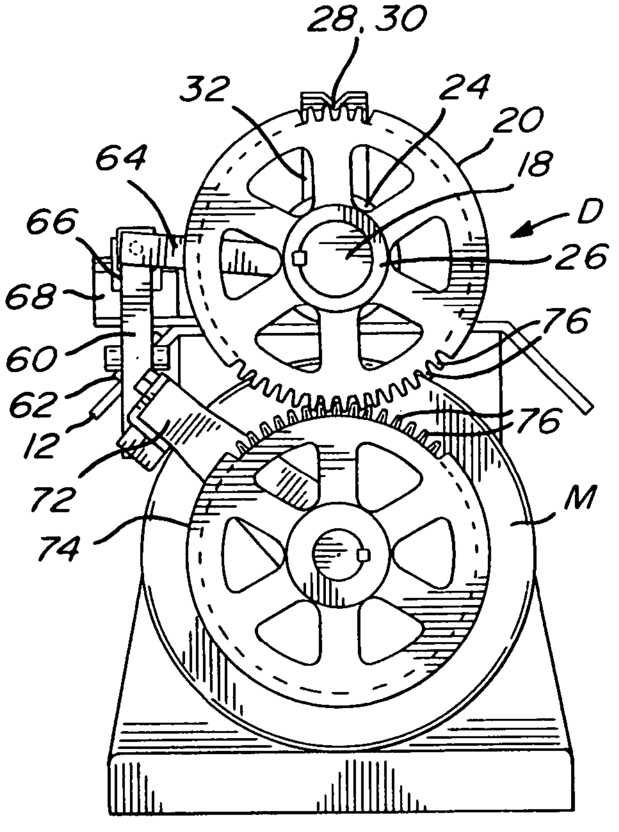
FIG. 3 is a right-hand side view of the override device of FIG. 2.

At another end of the sleeve 16 opposite the enlarged end 24 thereof, there is fixedly mounted a pulley frame 34 with a pulley 36 being mounted for free rotation around the shaft 18. As a single manual actuating mechanism, a chain 38 is engaged around the pulley 36 for manually operating the pulley 36 in order to manually operate the closure in a manner described in more details hereinafter. A hub 40 extends outwardly of the pulley 36, as best seen in FIG. 4. A small disk 42 is mounted tangentially on the hub 40, as best seen in FIGS. 1 and 4.

A cam member 44 is secured with a key 46 (see FIG. 4) to a second end (i.e. the left-handmost end on FIG. 1) of the shaft 18, outwardly of the pulley 36 and its disk 42. As best seen in FIG. 4, the cam member 44 comprises a cylindrical cam 48 extending from a bottom annular wall 50, and a cylindrical extension 52 extending from the bottom wall 50 in a direction opposite the cylindrical cam 48. The extension 52 is fixedly keyed to the shaft 18. The cylindrical cam 48 includes a free end which defines a cam surface 54 which abuts the disk 42 of the hub 40 of the pulley 36 and which symmetrically extends from a shallow recess 56 (see FIG. 1) outwardly from the bottom wall 50 towards a peak formation 58 which is diametrically opposite the recess 56. The hub 40 of the pulley 36 extends within the cylindrical cam 48 of the cam member 44 and at most abuts the bottom wall 50 thereof when the disk 42 lies in the recess 56. In the position of the shaft 18 shown in FIG. 1, the disk 42 rests in the recess 56.

With reference to FIG. 1, a lever 60 which is pivotally mounted to a bracket member 62 secured to the bracket 12 of the motor M is pivotally connected at its upper end to a first end of a pushrod 64 which has its other end attached to the hub 26 of the first gear wheel 20. The upper end of the lever 60 also abuts a wheel 66 of a switch 68 adapted, when triggered, to interrupt power to the electric motor M, as it will be described in details hereinbelow. A lower end of the lever 60 comprises a needle 70 which abuts a lever mechanism 72 adapted to disengage the gears of the motor M from the output shaft 10 to allow a second gear wheel 74 which is mechanically coupled to the output shaft 10 (at least when the lever mechanism 72 has disengaged the motor gears from the output shaft 10) to operate freely the output shaft 10.

Figure 2:
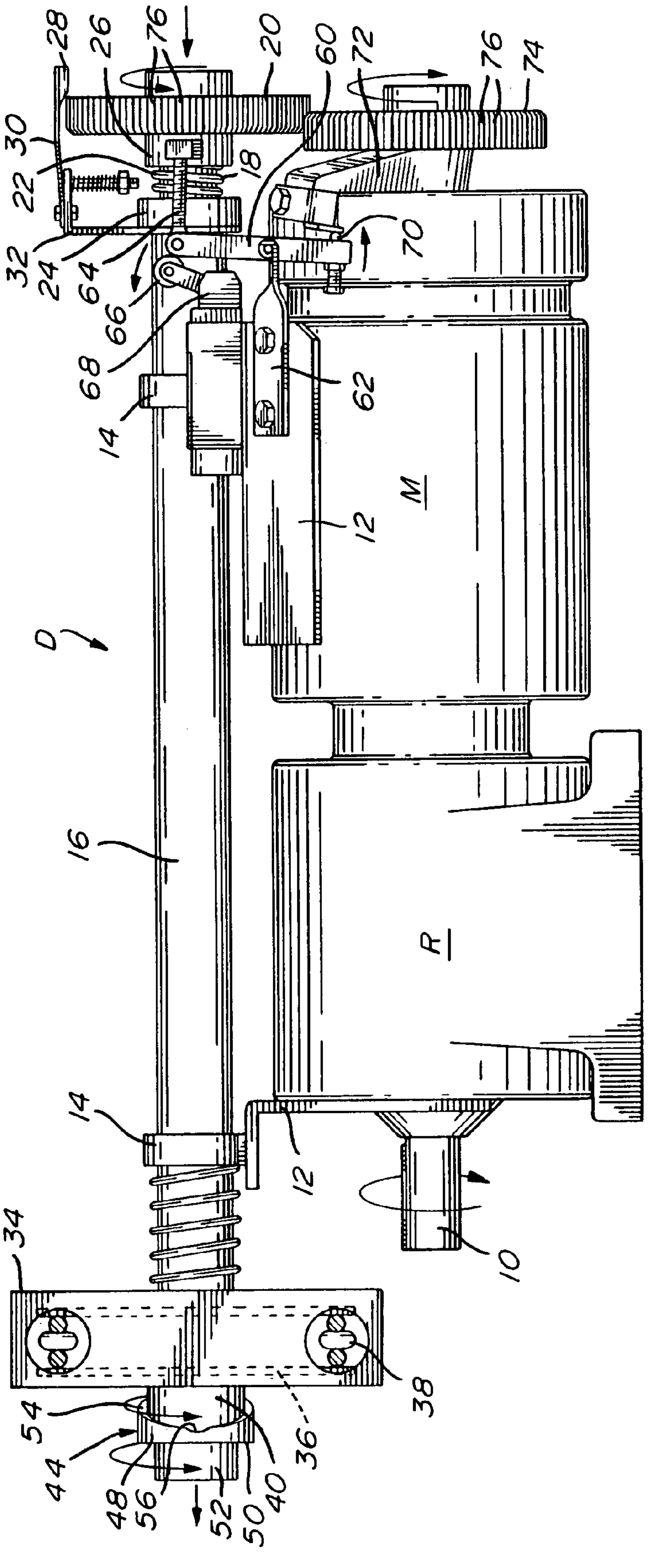
FIG. 2 is a bottom plan view partly in cross-section of the override device of FIG. 1 but shown in a second position thereof wherein the closure is adapted to be manually operated.

When it is desired to manually operate the closure, the user grasps the chain 38 and pulls thereon in an appropriate direction thereby causing the pulley 36 to rotate. As the first gear wheel 20 is prevented from rotating due to the finger 28 which is engaged (see FIG. 1) between a pair of teeth thereof, the shaft 18 and the cam member 44 are also prevented from rotating. However, the rotation of the pulley 36 causes the disk 42 to displace along the cam surface 54 from the recess 60 thereof towards the peak formation 58. This movement forces the cam member 44 outwardly away from the pulley 36 thereby causing the shaft 18 to gradually displace within the sleeve 16 from right to left in FIGS. 1 and 2. The longitudinal movement of the shaft 18 causes the first gear wheel 20 to displace along the axis of rotation thereof towards the pulley 36. At one point, the first gear wheel 20 disengages from the finger 28 while meshing into engagement with the second gear wheel 74, as seen in FIG. 2. A further rotation of the pulley 36 by way of the manual operation of the chain 38 produces the rotation of the shaft 18 and thus of the first and second gear wheels 20 and 74. At that point, the cam member 44 rotates with the shaft 18, with the cylindrical cam 48 of the former remaining at a same relative position with respect to the disk 42, wherein the disk 42 is located adjacent the peak formation 58 for maintaining the shaft 18 slightly to the left with the first gear wheel 20 being disengaged from the finger 28 and engaged to the second gear wheel 74. The force of the first spring 22 is set in order that, when the first and second gear wheels 20 and 74 are engaged, a pulling action on the chain 38 does not further displace the disk 42 along the cam surface 54, wherein the disk 42 which rotates with the pulley 36 forces the rotation of the cam member 44 and thus of the shaft 18 and of the first and second gear wheels 20 and 74.

The displacement of the first gear wheel 20 towards the pulley 36, asides from producing the engagement thereof with the second gear wheel 74, causes the pushrod 64 to displace the upper end of the lever 60 towards the switch 68 and to thus displace the wheel 66 so as to trigger the switch 68 for cutting all power to the motor M and therefore safely prevent the motor M from operating while the closure is being manually opened or closed by the chain 38. The pivot of the lever 60 also forces the lower end thereof to displace the lever mechanism 72 for disengaging the motor M from the output shaft 10 thereby allowing the latter to be directly driven by the second gear wheel 74. Thus, in FIG. 2, the chain 38 manually drives the pulley 36 which causes, in order, the rotation of the cam member 44, the shaft 18, the first gear wheel 20, the second gear wheel 74 and the output shaft 10.

A slight reverse displacement of the chain 38 and thus of the pulley 36 allows the disk 42 to slide on the cam surface 54 from the peak formation until it sets in the recess 56. The first spring 22 biases the shaft 18 and thus the cam member 44 towards the right, i.e. towards the position thereof of FIG. 1.

Figure 5:
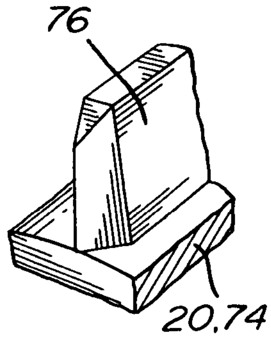

FIG. 5 illustrates a typical tooth 76 of the first and second gear wheels 20 and 74 which defines a composite taper at the end thereof facing the other gear wheel 20,74 for facilitating the meshed engagement of both gear wheels 20 and 74 when the first gear wheel 20 is displaced in translation along its rotation axis towards the second gear wheel 74 during the axial displacement of the shaft 18 between FIGS. 1 and 2.

FIGS. 6 to 9 illustrate a second override device D' also in accordance with the present invention for allowing a closure normally driven by an electric motor to be manually operated in a single step requiring the handling of a single actuating mechanism, such as herein shown a chain hoist. In this case, the axis of rotation of the manually operated pulley is not parallel to the axis of rotation of the output shaft, as it is the case in the first embodiment of FIGS. 1 to 5 wherein the axes of rotation of the pulley 36 and of the output shaft 10 are parallel.

Therefore, the pulley 36, the shaft 18, the first gear wheel 20 and the cam member 44, as well as secondary components related thereto, form a first drive mechanism, whereas the second gear wheel 74 and its connection to the output shaft 10 form a second drive mechanism, whereby when the chain 38 is manually operated, the pulley 36 causes the shaft 18 to translationally displace and then the cam member 44, the shaft 18 and the first gear wheel 20 to rotate with the latter meshing with the second gear wheel 74 and thus causing it and the output shaft 10 to rotate.

In the following description which pertains to the override device D' of FIGS. 6 to 9, components which are identical in function and identical or similar in structure to corresponding components of the device D bear the same reference as in FIGS. 1 to 5 but are tagged with the suffix "'" whereas components which are new to the device D' of FIGS. 6 to 9 are identified by new reference numerals in the hundreds.

Figure 6:
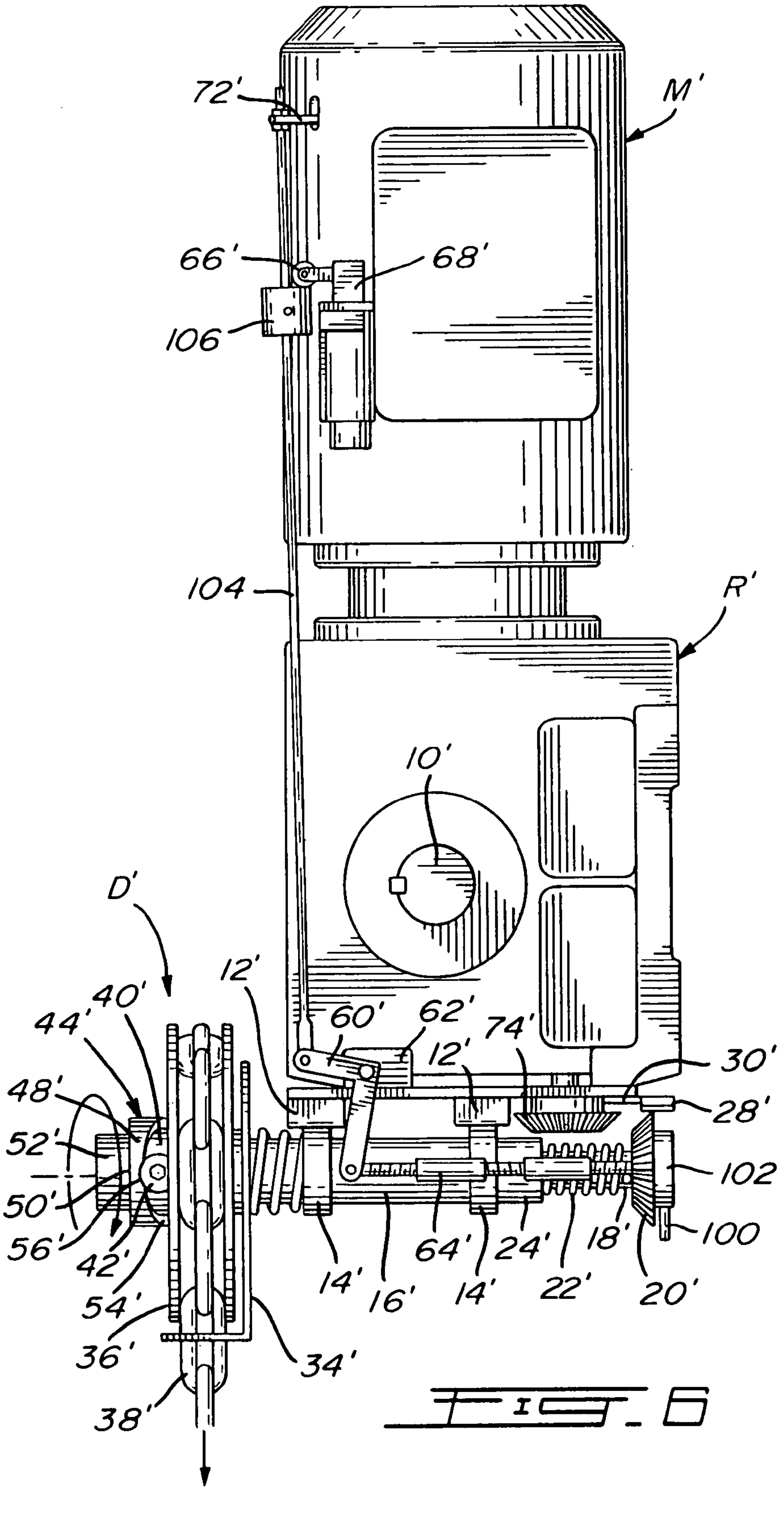
FIG. 6 is an elevational view of a second embodiment of an override device in accordance with the present invention for allowing manual operation of a closure normally driven by an electric motor, the device being shown in a first position thereof wherein the closure is adapted to be driven by the electric motor.

With reference mainly to FIG. 6 which shows the device D' in a normal, i.e. motor driven, position, the override device D' is adapted on an electric motor M' provided with a gearbox reducer R'. An output shaft 10' is adapted to drive a closure, such as a garage door (not shown).

The override device D' comprises the following components. A pair of brackets 12' which are secured to the reducer R' support with a pair of collars 14' an elongated fixed sleeve 16' of annular cross-section. An elongated drive shaft 18' is journaled in the sleeve 16' for rotation therein and also for longitudinal displacement therealong. A first beveled gear wheel 20' is fixedly secured at a first end (the right end on FIGS. 6 and 7) of the shaft 18'. A first spring 22' disposed around the first end of the shaft 18' is compressed between an end 24' of the sleeve 16' and the first gear wheel 20'. The first gear wheel 20' is provided with a stop member 100 extending radially from a hub 102 of the first gear wheel 20'. In the right-handmost position of the shaft 18' of FIG. 6, the stop member 100 is located opposite a finger 28' of an arm 30' which is mounted to the reducer R'.

At another end of the sleeve 16' opposite the end 24' thereof, there is fixedly mounted a pulley frame 34' with a pulley 36' being mounted for free rotation around the shaft 18'. A chain 38' is engaged around the pulley 36' for manually operating the pulley 36' in order to manually operate the closure in a manner described in more details hereinafter. A hub 40' extends outwardly of the pulley 36', as best seen in FIG. 4 regarding the device D of FIGS. 1 to 5 as the structure of FIG. 4 is found integrally in the device D' of FIGS. 6 to 9. A small disk 42' is mounted tangentially on the hub 40', as best seen in FIGS. 4 and 6.

A cam member 44' is secured with a key (as the key 46 of FIG. 4) to a second end (i.e. the left-handmost end on FIG. 6) of the shaft 18', outwardly of the pulley 36' and its disk 42'. As in FIG. 4, the cam member 44' comprises a cylindrical cam 48' extending from a bottom annular wall 50', and a cylindrical extension 52' extending from the bottom wall 50' in a direction opposite the cylindrical cam 48'. The extension 52', is fixedly keyed to the shaft 18'. The cylindrical cam 48' includes a free end which defines a cam surface 54' which abuts the disk 42' of the hub 40' of the pulley 36' and which symmetrically extends from a shallow recess 56' outwardly from the bottom wall 50' towards a peak formation 58' (see FIG. 7) which is diametrically opposite the recess 56'. The hub 40' of the pulley 36' extends within the cylindrical cam 48', of the cam member 44' and abuts at most the bottom wall 50' thereof when the disk 42' lies in the recess 56'. In the position of the shaft 18' shown in FIG. 6, the disk 42' rests in the recess 56'.

With reference to FIG. 6, a lever 60' which is pivotally mounted to a bracket member 62' secured to the reducer R' is pivotally connected at its lower end to a first end of a first pushrod 64' which has its other end attached to the first gear wheel 20'. An upper end of the lever 60' is connected to a lower end of a second pushrod 104 which carries a trip 106 which abuts a wheel 66' of a switch 68' adapted, when triggered, to interrupt power to the electric motor M', as it will be described in details hereinbelow. An upper end of the second pushrod 104 is connected to a lever mechanism 72' adapted to disengage the gears of the motor M' from the output shaft 10' to permit a second beveled gear wheel 74' which is mechanically coupled to the output shaft 10' (at least when the lever mechanism 72' has disengaged the motor gears from the output shaft 10') to operate freely the output shaft 10'.

Figure 7:
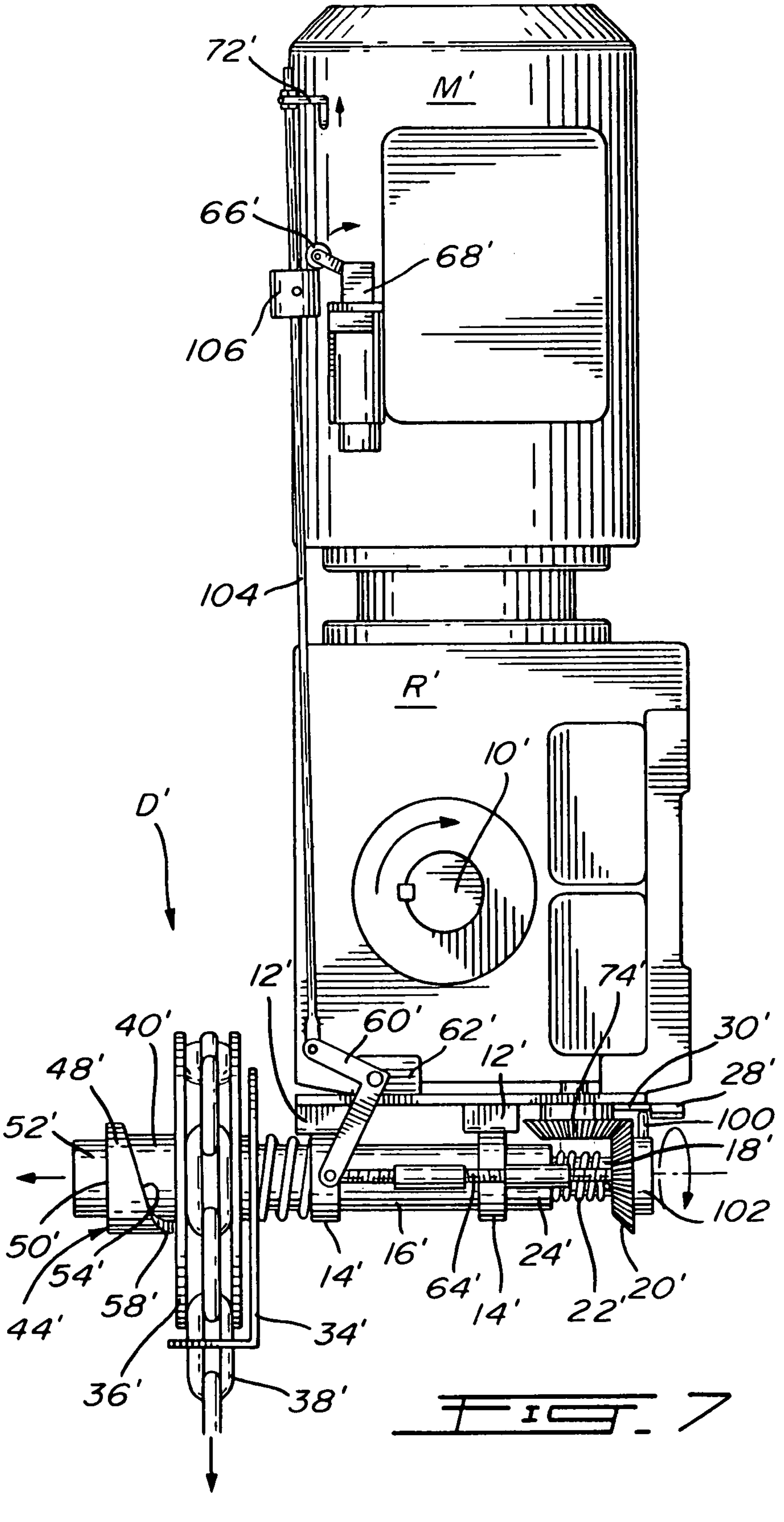
FIG. 7 is an elevational view of the override device of FIG. 6 but shown in a second position thereof wherein the closure is adapted to be manually operated.
Figure 8:
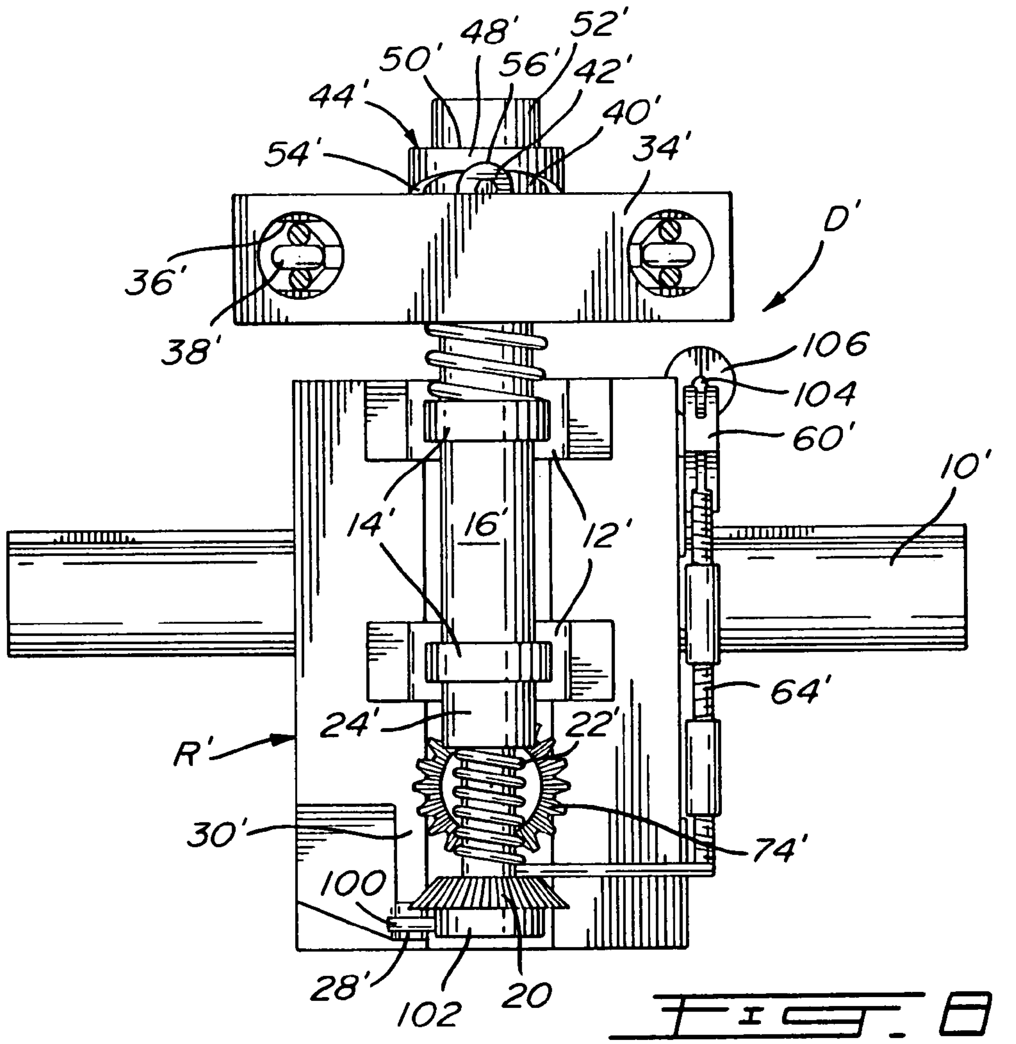
FIG. 8 is a bottom plan view of the override device of FIG. 7.
Figure 9:
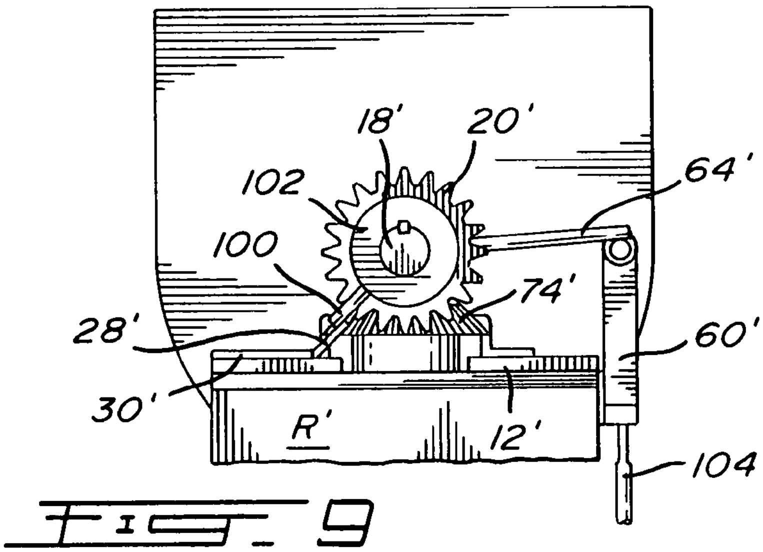
FIG. 9 is a part of an inverted right-hand side elevational view of the override device of FIG. 7.

When it is desired to manually operate the closure, the user grasp the chain 38' and pulls thereon in an appropriate direction thereby causing the pulley 36' to rotate. The shaft 18' and the first gear wheel 20' will rotate with the pulley 36' until the stop member 100 abuts the finger 28' (see FIG. 9); thereafter, further rotation of the pulley 36' will thus not translate in a rotation of the shaft 18' and of the first gear wheel 20'. Therefore, the cam member 44' is also prevented from rotating. However, the rotation of the pulley 36' causes the disk 42' to displace along the cam surface 54' from the recess 60' thereof towards the peak formation 58'. This movement forces the cam member 44' outwardly away from the pulley 36' thereby causing the shaft 18' to gradually displace within the sleeve 16' from right to left in FIGS. 6 and 7. The longitudinal movement of the shaft 18' causes the first gear wheel 20' to displace along the axis of rotation thereof towards the pulley 36'. At one point, the movement of the first gear wheel 20' causes the stop member 100 to disengage from the finger 28 while the first gear wheel 20' meshes into engagement with the second gear wheel 74', as seen in FIG. 7. A further rotation of the pulley 36' by way of the manual operation of the chain 38' produces the rotation of the shaft 18' and thus of the first and second gear wheels 20' and 74'. At that point, the cam member 44' rotates with the shaft 18', with the cylindrical cam 48' of the former remaining at a same relative position with respect to the disk 42', wherein the disk 42' is located adjacent the peak formation 58' for maintaining the shaft 18' slightly to the left with the first gear wheel 20' being engaged to the second gear wheel 74' while the stop member 100 is free of the finger 28'. The force of the first spring 22' is set in order that, when the first and second gear wheels 20' and 74' are engaged, a pulling action on the chain 38' does not further displace the disk 42' along the cam surface 54', wherein the disk 42' which rotates with the pulley 36' forces the rotation of the cam member 44' and thus of the shaft 18' and of the first and second gear wheels 20' and 74'.

The displacement of the first gear wheel 20' towards the pulley 36', asides from producing the engagement thereof with the second gear wheel 74', causes the pushrod 64' to pivot the lever 60' so that the second pushrod 104 displaces the wheel 66' so as to trigger the switch 68' and hence cut all power to the motor M' and therefore safely prevent the motor M' from operating while the closure is being manually opened or closed by the chain 38'. The displacement of the second pushrod 104 also forces the displacement of the lever mechanism 72' which accordingly disengages the motor M' from the output shaft 10' thereby allowing the latter to be directly driven by the second gear wheel 74'. Thus, in FIG. 8, the chain 38' manually drives the pulley 36' which causes, in order, the rotation of the cam member 44', the shaft 18', the first gear wheel 20', the second gear wheel 74' and the output shaft 10'. A slight reverse displacement of the chain 38' and thus of the pulley 36' allows the disk 42' to slide on the cam surface 54' from the peak formation 58' until it sets in the recess 56'. The first spring 22' biases the shaft 18' and thus the cam member 44' towards the right i.e. towards the position thereof of FIG. 1.

Accordingly, both the override devices D and D' described hereinabove allow for the manual operation in a single step, i.e. by operating a single mechanism (e.g. a chain), of a closure normally driven by an electric motor. Asides from driving the closure, the devices D and D' of the present invention cause, by the operation of the chain, the interruption of the power to the motor and the disengagement of the motor and output shaft.

For safety considerations, the power is cut off to the motor before the first and second gear wheels 20 and 74 become engaged so that the motor M does not drive the hoist, i.e the shaft 18, the pulley 36 and the chain 38. Preferably, the meshing of the first and second gear wheels 20 and 74 takes place after the power is cut off to the motor M but before the brake is released therefrom.

Obviously, a V-belt could be used with a appropriate pulley instead of the illustrated arrangement of the pulley 36 and chain 38. Furthermore, a back-up battery pack could be used instead of the hoist to drive the pulley 36 or even more directly the shaft 18.

The present invention can obviously be adapted to any type of motor, and not only those configured as in the present figures.

We claim:

1. An override device for allowing manual operation of an output shaft normally driven by a motor, comprising manual actuating means, first drive means operated by said actuating means, second drive means driven by said first drive means and driving the output shaft only during the operation of said override device, power cut-off means adapted when operated to interrupt power to the motor, disengagement means which when operated allow the output shaft to rotate and allow said second drive means to drive the output shaft while the motor is not operating, said actuating means, when manually operated, first causing an engagement of said first and second drive means while causing said power cut-off means to cut power to the motor and said disengagement means to allow said second drive means to drive the output shaft, said actuating means then causing said first drive means to drive said second drive means and thus also the output shaft connected to said second drive means for manual operation of the output shaft.

2. An override device as defined in claim 1, wherein said first and second drive means comprises respectively first and second gears, said second gear being connected to the output shaft for rotation therewith, said actuating means being adapted to displace said first gear relative to said second gear between first and second positions, wherein said first and second gears are in meshed engagement only in said second position, said displacement in translation of said first gear first operating said power cut-off means and then, once in said meshed engagement, operating said disengagement means respectively for interrupting power to the motor and for allowing said second gear to drive the output shaft while the motor is non operational.

3. An override device as defined in claim 2, wherein said actuating means comprise chain means engaged on pulley means, cam means abutting said pulley means and adapted upon initial rotation of said pulley means to axially displace said first gear for said displacement in translation from said first position towards said second position in engagement with said second gear, wherein further rotation of said pulley means with said first gear in said second position causes the rotation of said first gear and thus of said second gear and of the output shaft.

* * * * *